Dec. 14, 1971        A. R. DAVIDSON ET AL        3,627,535
METHOD AND APPARATUS FOR REMOVAL OF OIL FROM SURFACE
OF FRIED FOOD PRODUCTS
Filed July 31, 1969                                2 Sheets-Sheet 1

FIG. I

ARTHUR R. DAVIDSON
JOHN E. HAUBNER
INVENTORS.
BY
BUCKHORN, BLORE, KLARQUIST & SPARKMAN
ATTORNEYS

United States Patent Office 3,627,535
Patented Dec. 14, 1971

3,627,535
METHOD AND APPARATUS FOR REMOVAL OF OIL FROM SURFACE OF FRIED FOOD PRODUCTS
Arthur R. Davidson, West Linn, and John E. Haubner, Tigard, Oreg., assignors to Lamb-Weston, Inc., Portland, Oreg.
Filed July 31, 1969, Ser. No. 846,452
Int. Cl. A23l 1/12
U.S. Cl. 99—1                                              3 Claims

ABSTRACT OF THE DISCLOSURE

Oil is removed from surface of food products after cooking in hot oil by subjecting the product to a blast of air saturated with water vapor substantially immediately after removal of the product from the oil and before the product has had a chance to cool substantially.

BACKGROUND OF THE INVENTION

When food products such as potatoes are cooked in a hot oil, a substantial amount of the oil adheres to the product surface upon its removal from the hot cooking bath. If not removed from the surface, some of the oil will be absorbed into the product which is undesirable from several standpoints. First, a minimum quantity of oil in the product is desired from the consumer's standpoint and also the oil which is retained in the product must be replaced and this can represent a substantial expense. For example, potato products can absorb and carry off from 8 to 12 percent of their weight in cooking oil.

Accordingly, many efforts have been made to develop systems for removing the oil from cooked food products including efforts to shake off or blot off the excess oil or fat or to blow it off. In some of these efforts external heat, for example, by radiant energy or heated air, has been applied to the product to try to keep the oil fluid and enhance its removal. However, even though ambient temperatures as high as 450 degrees have been used, the high rate of water vaporization from the product caused the product to cool rapidly with a consequent absorption of the oil within the product before it could be removed from the surface. It is theorized that the cooling of the product causes a partial vacuum to form therein whereupon the oil is forced back into the product by the ambient pressure.

SUMMARY OF THE INVENTION

In accordance with the present invention, the food product is removed from the hot oil and immediately thereafter is subjected to a blast of gas saturated with water vapor. The gas velocity is such as to blow the oil from the surface of the product and the gas is maintained at a temperature at least as great as the boiling point of water. Inasmuch as the gas is saturated with water vapor, no vaporization of water from the surface and consequent loss of the heat of vaporization results. Consequently, the oil is blown from the surface of the product while the product is still actively emitting steam and before any cooling of the product occurs. The product may be subjected to mechanical agitation while subjected to the air blast in order to expose all surfaces of the product to the blast of air.

DRAWINGS

Figure 1:
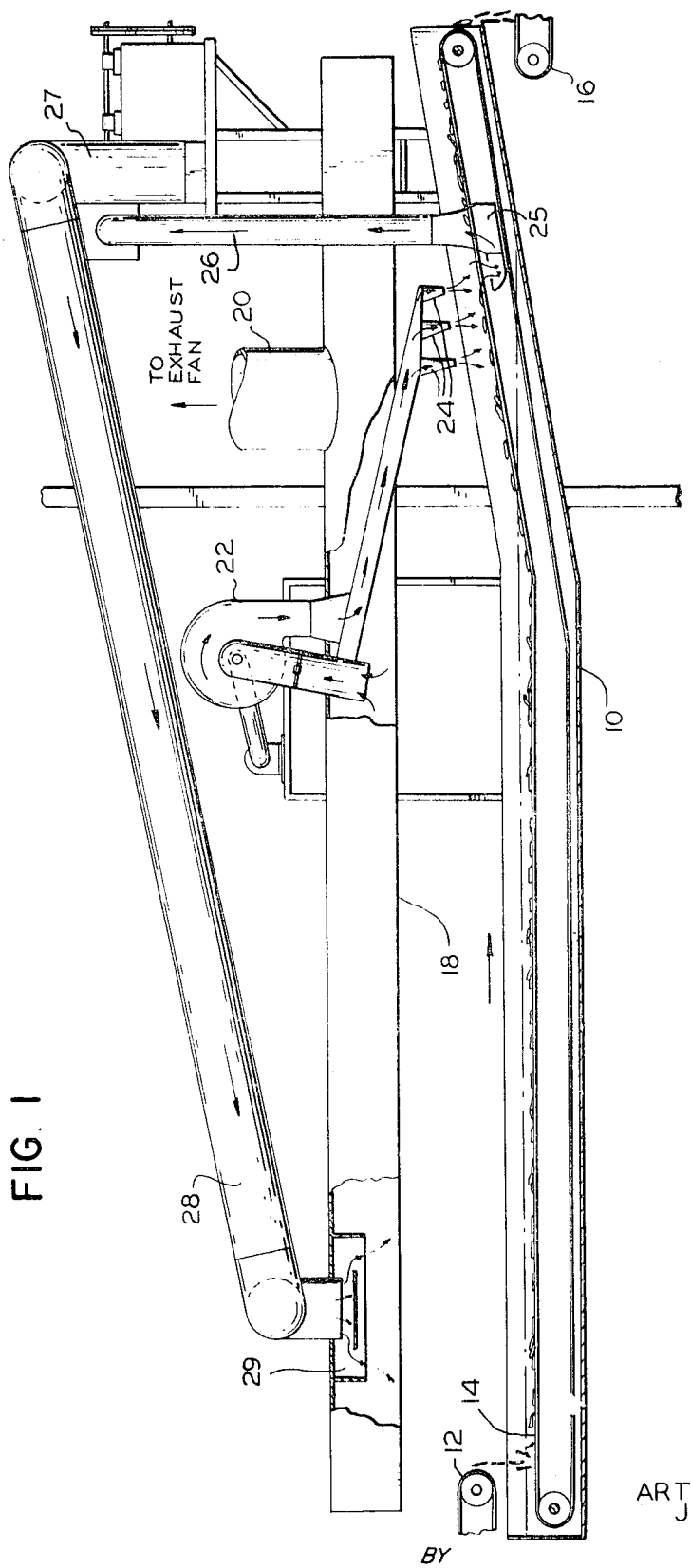
Figure 2:
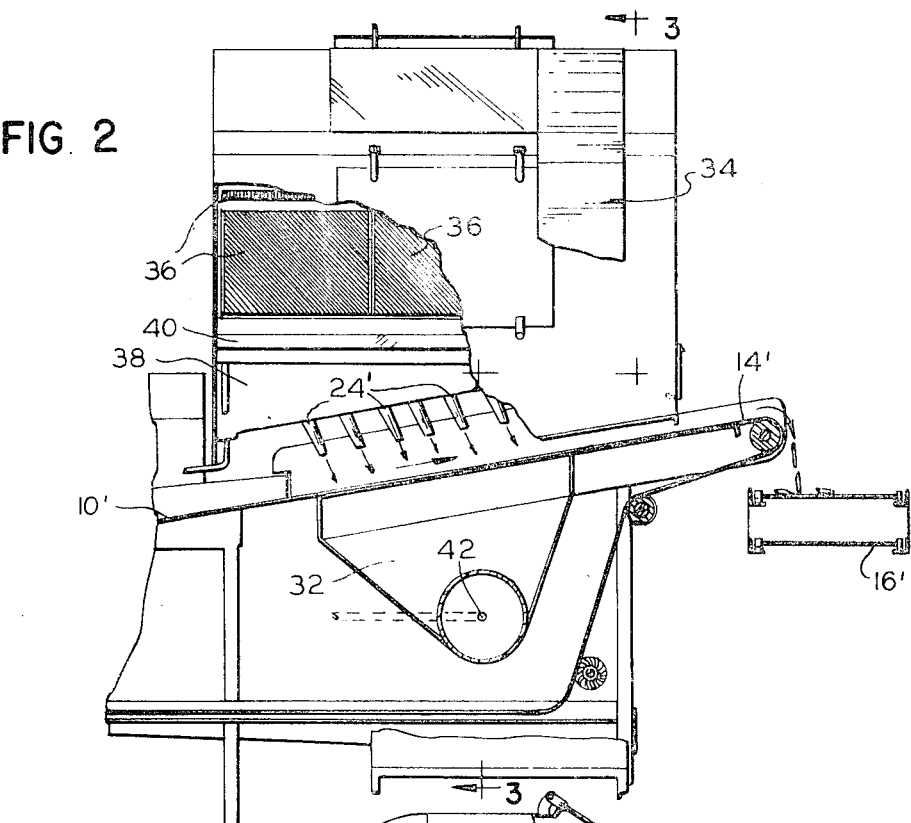
Figure 3:
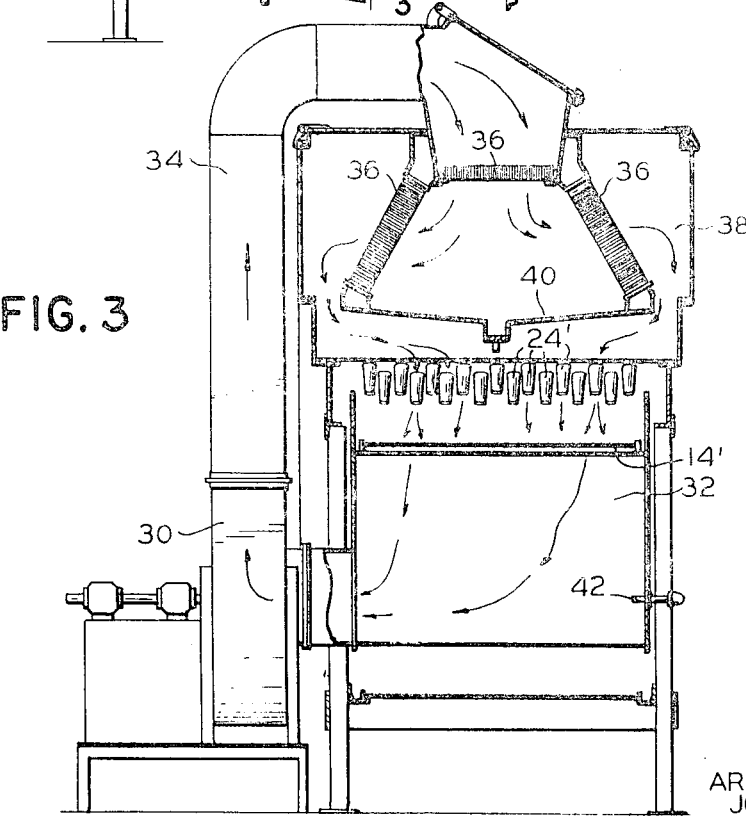

FIG. 1 is a schematic representation of an apparatus for performing the process of the invention;
FIG. 2 is a schematic representation of another apparatus for performing the process of the invention; and
FIG. 3 is a sectional view taken along line 3—3 of FIG. 2.

Referring to FIG. 1, indicated at 10 is a cooking vessel or vat of the type in which potatoes are fried in oil in the preparation of frozen french fries. The raw, cut strips are fed into one end of the vat 10 by suitable means such as a conveyor 12 and are conveyed through the vat on a conveyor 14. At the discharge end, the vat 10 is upwardly inclined so that the conveyor emerges from above the surface of the oil maintained within the vat, the cooked or partially cooked fries being fed from the conveyor 14 onto a conveyor 16 which carries the fries for further processing.

Over the vat 10 is positioned a hood 18 for collecting the steam which is emitted from the frying potatoes, the hood being vented through a stack 20 to a suitable exhaust system.

In accordance with the present embodiment of the invention, a portion of the steam saturated air collected from over the vat 10 is withdrawn from the hood 18 by a blower 22 and blown through nozzles 24 onto the product being carried on the conveyor 14 immediately after the product emerges from the oil within the vat 10. Preferably the nozzles 24 should be positioned so that the product is subjected to the blast of steam saturated air within five or six seconds of the time that it emerges from the hot oil. During this period, the potato strips will still be sufficiently hot (having an internal temperature of about 218° F.) that the water within the potatoes is vaporizing to form steam and there is a positive pressure within the potatoes to maintain the oil upon the surface so that it can be blown off the surface by the blast of air from the nozzles 24. If desired, a vibrator (not shown) can be operatively connected to the conveyor 14 to cause at least the portion underneath the nozzles 24 to vibrate and cause mechanical shaking of the product at the same time it is being subjected to the blast from the nozzles 24.

It is highly desirable that the air blasting from the nozzles 24 be at a temperature substantially at the boiling point of water, and it is also highly important that the air be saturated with water vapor. If the air is not sufficiently heated or if it is not saturated, rapid cooling of the product will result with the resulting formation of a partial vacuum within the product which causes the oil to be forced back into the product prior to its being removed by the air blast.

The air velocity should be sufficiently high to blow the oil from the surface of the product. In the case of french fried potatoes, an air velocity of between about 1500 to 2000 feet per minute is satisfactory. Alternatively to blowing the air from jets, a negative pressure could be formed on one side of the conveyor and air drawn through the product to cause the necessary air movement over the surface of the product to remove the oil therefrom.

A recycling system for the oil-laden air may also be provided comprising in the present embodiment an intake manifold 25 connected by a pipe 26 to the inlet of a fan 27. The discharge of the latter is connected to a conduit 28 which discharges into the hood 18 at 29 near the inlet end of the vat 10. The recycling system also creates a negative pressure on the underside of the conveyor 14 to maximize the air velocity through the layer of potatoes thereon.

Referring now to FIG. 2, only the discharge end of the vat 10' is shown. In this embodiment a plurality of nozzles 24' are arranged over the discharge end of the conveyor 14' which nozzles are supplied with air through a fan 30 adapted to draw air from a plenum 32 arranged beneath the upper flight of the conveyor 14'. Air is passed from the fan 30 upwardly through a duct 34 and through oil filters 36 into a manifold 38 which distributes the air through the nozzles 24'. The oil filters are for the purpose of removing droplets of oil from the recirculating air which oil may drop upon a collecting trough 40 for suitable removal. A steam injection nozzle 42 connected to a suitable source of steam is mounted in the plenum 32 so that steam may be injected into the recirculating air to maintain it in a heated, saturated condition as it contacts the product.

For certain products or certain types of oils it may be found desirable to maintain the gas at a temperature above the boiling point of water. In such case the air may be subjected to supplemental heating by any suitable means and superheated steam injected so as to maintain it in a saturated condition at temperatures above the boiling point of water.

Having illustrated and described certain preferred embodiments of the invention, it should be apparent that the invention permits of modification in arrangement and detail.

We claim:

1. Process for removing oil from the surface of a food product after treatment of such product in a hot oil comprising the steps of
    removing the food product from the hot oil
    and before the product has cooled below the boiling point of water subjecting said food product to a blast of gas having a temperature at least as great as the boiling point of water and saturated with water vapor thereby to blow oil from the surface of the product and continually maintaining said food product in said blast of gas until the desired amount of oil is removed from said product.

2. The process of claim 1 wherein said gas is air.

3. The process of claim 1 wherein said gas has a velocity of at least about 1500 feet per minute.

References Cited

UNITED STATES PATENTS

| | | | |
|---|---|---|---|
| 1,265,236 | 5/1918 | Moore | 99—1 |
| 2,853,937 | 9/1958 | Peck | 99—355 X |
| 2,902,921 | 9/1959 | Brodrick | 99—355 UX |
| 3,346,391 | 10/1967 | Miller et al. | 99—1 |
| 3,353,962 | 11/1967 | Smith, Jr. | 99—100 P |
| 3,486,904 | 12/1969 | Ziegler | 99—1 |

OTHER REFERENCES

Food Packer, February 1955, pp. 34–37.

FRANK W. LUTTER, Primary Examiner

S. L. WEINSTEIN, Assistant Examiner

U.S. Cl. X.R.

99—100 P